May 2, 1950
C. F. BLACK
2,506,194
TRAILER HITCHING DEVICE
Filed May 11, 1946
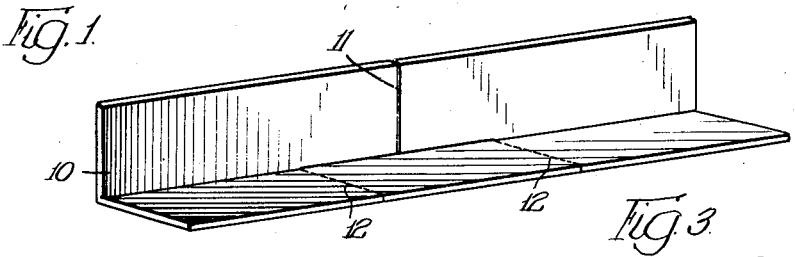
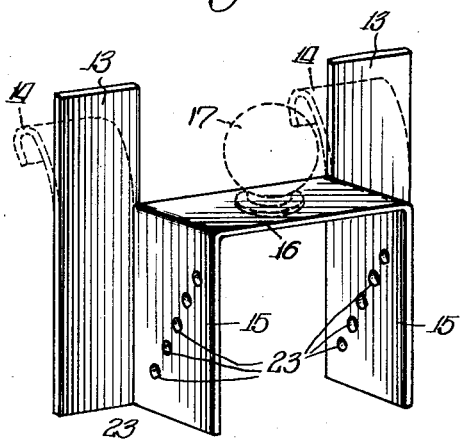
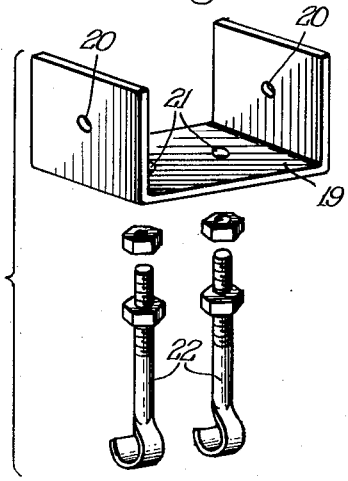
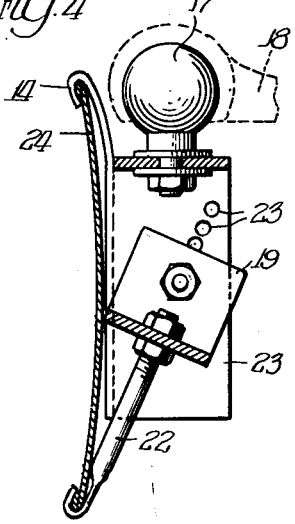
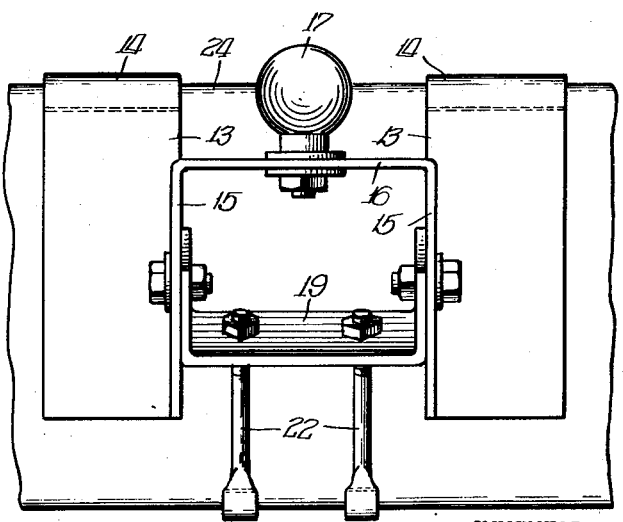
INVENTOR.
Charles F. Black,
BY
Cromwell, Greist & Warden
attys.

Patented May 2, 1950

2,506,194

UNITED STATES PATENT OFFICE 2,506,194

TRAILER HITCHING DEVICE

Charles F. Black, Grass Lake, Ill.

Application May 11, 1946, Serial No. 669,124

5 Claims. (Cl. 280—33.44)

This invention has to do with coupling members for vehicle trailers. More particularly, it relates to a trailer hitching device that can be adapted to a wide range of rear bumpers of different makes of vehicles in order to accommodate any suitable type of trailer drag unit, and the provision of such a device is a principal object of the invention.

More specifically, it is an object of the invention to provide a trailer hitching device comprising upper clamping means adapted to be secured to the top portion of a vehicle rear bumper in downwardly depending position, the clamping means including an outwardly projecting trailer drag supporting section, and lower clamping means adjustably secured to the drag supporting section and adapted to be secured to the lower portion of the bumper.

Other objects of the invention will in part be obvious and will in part appear hereinafter.

The invention accordingly comprises the features of construction, combination of elements, and arrangement of parts, which will be exemplified in the construction hereinafter set forth and the scope of the application of which will be indicated in the claims.

For a fuller understanding of the nature and objects of the invention reference should be had to the following detailed description taken in connection with the accompanying drawing, in which:

Fig. 1 is a perspective view of a so-called angle iron, or plate, illustrating a preferred type of element prepared for use in constructing an upper clamping means and trailer drag supporting section for a vehicle rear bumper;

Fig. 2 is a perspective view illustrating the element of Fig. 1 bent in such a manner as to provide an upper clamping member and trailer drag supporting section;

Fig. 3 is a perspective view of a preferred form of lower clamping means constituting a bridging member and hook bolts, or links, adjustably to be secured to the bridging member, which bridging member itself can adjustably be secured to the trailer drag supporting sections of the upper clamping member illustrated in Fig. 2;

Fig. 4 is a side elevational view, partly in section, of an assembled trailer hitching device secured in clamped position to a conventional type of vehicle rear bumper and carrying the ball portion for a trailer drag supporting socket, the latter being shown in dotted line position; and Fig. 5 is a front elevational view of the trailer hitching device depicted in Fig. 4.

Referring more particularly to the drawing there is shown at 10 an angle member, preferably of conventional angle iron design. Such a piece of stock of sufficient thickness can readily be utilized to provide one of the chief features of construction of the trailer hitching device embodied by the present invention. That is, by severing one plate portion of the angle member in any suitable manner as indicated at 11, and bending the other plate section transversely in the area of the dotted lines 12, 12, an upper clamping means of generally H-shaped configuration is provided as more fully illustrated in Fig. 2.

From the severing and bending operations to provide the H-shaped configuration there results upper leg portions 13, 13, which next are bent preferably as indicated in dotted line position at 14, 14. Thereafter the device is ready to be secured to the top of a vehicle rear bumper. The remaining bent portions of the H-shaped device will provide projecting sections 15, 15, and 16. These projecting sections provide a support for a trailer drag unit as well as a securing means for adjustably attaching a lower clamping means to the vehicle rear bumper. For example, on the horizontal projecting section 16 there is shown in dotted lines a ball member 17 adapted to be received by the socket member of a trailer drag of any suitable design as shown in dotted lines 18 in Fig. 4.

The lower clamping means depicted in Fig. 3 is made to be connected to the projecting sections 15, 15. The lower clamping means includes a bridging member 19 having upstanding end portions with openings 20, 20, therein. In the lower or connecting section for these upstanding end portions additional openings 21, 21, are provided. The latter openings accommodate linking members 22, which preferably constitute hook bolts. The projecting sections 15, 15, each has a series of openings 23, 23, and preferably these are arranged diagonally as illustrated for reasons which will more fully appear hereinafter.

The bridging and linking members 19 and 22 respectively are secured in position to the extending sections 15, 15, by means of suitable machine bolts passed through openings 20, 20, in alignment with selected openings 23, 23.

The device when assembled as above described is ready to be clamped in position to almost any type of bumper as shown in Figs. 4 and 5. Conventional bumpers for different make cars range in size in cross section anywhere from about 3 to 6 inches and, as a rule, special trailer hitches are made to accommodate special types of bumpers for special makes of all automotive vehicles. However, by hooking or securing the curved portion 14 of the upper clamping member to the top portion of a bumper 24, and thereafter catching the linking members or hooks 22 under the lower portion of the bumper 24, the device of the present invention can be made to fit almost any conventional bumper because of the adjustments which are provided. By means of the adjustments the bridging member 19 can readily be raised or lowered along the sections 15, 15. It will be observed that this can be done by bringing the openings 20, 20, into alignment with selected upper or lower openings 23, 23, and securing the bridging members in this position. Since most bumpers are usually somewhat curved in cross section, the rows of openings 23, 23, are preferably placed at an angle so that the bridging and hooking members will more satisfactorily adapt themselves to the configuration of the bumper.

Further adjustment also can be secured by means of the threaded shank portions of the links or hook members 22.

The present bumper is of singularly rigid and sturdy construction, is universal in its application to different sizes of bumpers and can readily be placed in position for service.

Since certain changes may be made in the above construction and different embodiments of the invention could be made without departing from the scope thereof, it is intended that all matter contained in the above description or shown in the accompanying drawing shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described my invention what I claim as new and desire to secure by Letters Patent is:

1. In a trailer hitching device, the combination comprising upper clamping means adapted to be secured in downwardly depending position to the upper marginal edge of a vehicle rear bumper, said means including an outwardly projecting trailer drag supporting section, spaced apart legs depending from said section and lower clamping means adjustably secured between said legs of the drag supporting section and adapted to be secured to the lower marginal edge of said bumper.

2. In a trailer hitching device, the combination comprising upper clamping means adapted to be secured in downwardly depending position to the top portion of a vehicle rear bumper, said means including outwardly projecting spaced apart trailer drag supporting sections, and lower clamping means including a bridging member adjustably mounted between said sections to be raised and lowered therebetween and adapted to be connected to the lower portion of said bumper.

3. In a trailer hitching device, the combination comprising upper clamping means adapted to be secured in downwardly depending position to the top portion of a vehicle rear bumper, said means including outwardly projecting spaced apart trailer drag supporting sections, and lower clamping means including a bridging member mounted against said sections, said bridging member carrying link means adapted to be connected to the lower portion of said bumper.

4. In a trailer hitching device, the combination comprising upper clamping means adapted to be secured in downwardly depending position to the top portion of a vehicle rear bumper, said means including outwardly projecting spaced apart trailer drag supporting sections, and lower clamping means including a bridging member mounted between said sections, said bridging member carrying at least two spaced apart hook bolts adapted adjustably to be connected to the lower portions of said bumper.

5. In a trailer hitching device, the combination comprising an angle member, one section of which is severed and the other section of which is bent providing an upper clamping means generally H-shaped in configuration, the severed sections constituting the upper leg portions of said H-shaped configuration being bent to be secured to the top of a vehicle rear bumper, and lower clamping means adjustably secured to said bent sections which constitute lower leg portions of said H-shaped configuration, said lower clamping means being adapted to be secured to the lower portion of said bumper.

CHARLES F. BLACK.

REFERENCES CITED

The following references are of record in the file of this patent:

UNITED STATES PATENTS

| Number | Name | Date |
|---|---|---|
| 1,954,361 | Lewter | Apr. 10, 1934 |
| 2,101,622 | Milligan | Dec. 7, 1937 |
| 2,142,365 | McKee | Jan. 3, 1939 |
| 2,250,661 | Thorp et al. | July 29, 1941 |
| 2,268,181 | Bolton | Dec. 30, 1941 |
| 2,338,934 | Gross | Jan. 11, 1944 |